Jan. 16, 1962 W. R. LUNDRY 3,017,584

WAVE TRANSMISSION NETWORK

Filed Nov. 25, 1959

INVENTOR
W. R. LUNDRY

BY

Ralph P. Holcomb

ATTORNEY

United States Patent Office 3,017,584
Patented Jan. 16, 1962

3,017,584

WAVE TRANSMISSION NETWORK

Walter R. Lundry, Summit, N.J., assignor to Bell Telephone Laboratories, Incorporated, New York, N.Y., a corporation of New York Filed Nov. 25, 1959, Ser. No. 855,299
5 Claims. (Cl. 333—6)

This invention relates to wave transmission networks and more particularly to a directional filter set comprising two pairs of complementary low-pass and high-pass filters.

The principal object of the invention is to reduce the unusable transition interval between pass bands in a directional filter set. Other objects are to reduce the number of elements required, increase the loss in the transition interval, and provide constant-resistance input impedances in such a set.

It is common practice to establish two-way communication over a single pair of wires by transmitting in one direction over one frequency band and in the opposite direction over an adjacent band. Two-way repeaters requiring only one amplifier have been developed for such a system. Each repeater requires a four-port directional filter set comprising two pairs of complementary low-pass and high-pass filters alternately arranged in a closed path. To avoid reflections, the input impedance at each port should be a constant resistance in the pass band of each filter.

A four-port directional filter set with constant-resistance input impedances is disclosed, for example, in U.S. Patent 2,115,138, issued April 26, 1938, to Sidney Darlington. However, an objection to such a filter set is that the unusable transition interval between pass bands is large compared to the number of component elements required. The transition interval is the frequency band over which either one type of filter fails to pass or the other type fails to stop.

The present invention greatly reduces the transition interval by shifting the high-pass filter characteristic up in frequency and the low-pass characteristic down in frequency to make the pass band of each type of filter coincide with the stop band of the other type of filter. A susceptance corrector is added at each port to restore the constant-resistance input impedance. If a constant resistance is required only in the pass bands, as is often the case, each susceptance corrector may comprise simply the series combination of an inductor and a capacitor shunting the port. The branch resonates at the cross-over frequency of the filter characteristics and thus increases the loss in this region, which is a desirable result. If a constant resistance is desired at all frequencies, the susceptance corrector may take the form of a terminated, band-pass filter with a pass band coinciding with the transition interval. In either case, the filter set requires less elements than those heretofore known, for the same transition interval.

The nature of the invention and its various objects, features and advantages will appear more fully in the following detailed description of the typical embodiments illustrated in the accompanying drawings, of which:

Figure 1:
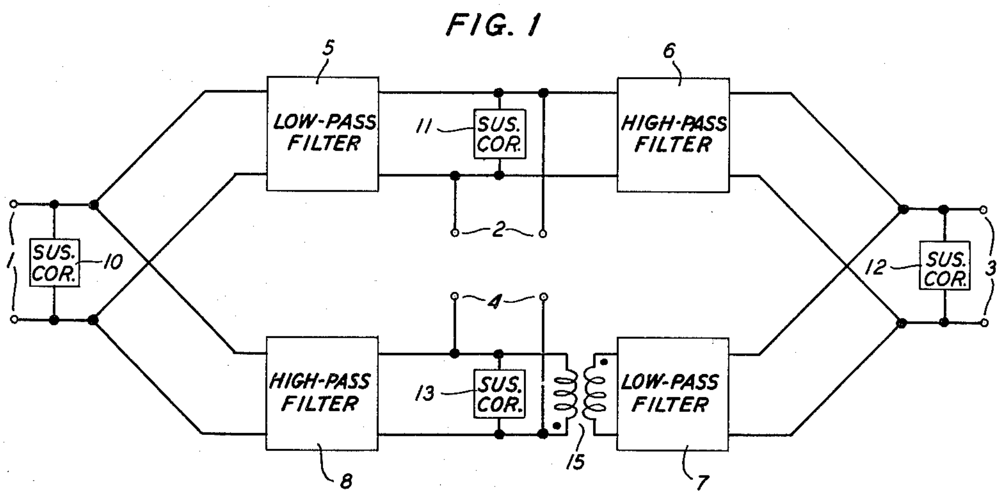
FIG. 1 is a schematic circuit of a four-port directional filter set in accordance with the invention.

The network shown in FIG. 1 has four ports designated 1, 2, 3, and 4 between which two low-pass filters 5, 7 and two high-pass filters 6, 8 are alternately connected to form a closed transmission path. Thus, the filter 5 is connected between ports 1 and 2, the filter 6 between ports 2 and 3, the filter 7 between ports 3 and 4, and the filter 8 between ports 1 and 4. The low-pass filters 5 and 7 have substantially identical transmission characteristics, as also do the high-pass filters 6 and 8. The pass bands of the low-pass filters and those of the high-pass filters are adjacent.

The network of FIG. 1 may be used as a two-way repeater between ports 1 and 3 if an amplifier is connected between ports 2 and 4. Frequencies passed by the low-pass filters will be transmitted in one direction and those passed by the high-pass filters will be transmitted in the opposite direction. A transformer 15, inserted between two of the ports, provides a phase reversal which improves the operation of the repeater.

Figure 2:
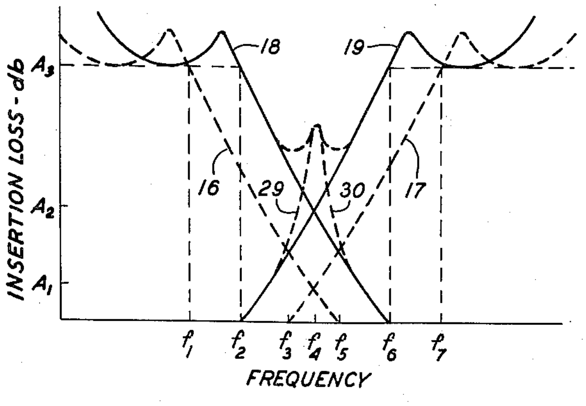
FIG. 2 shows typical characteristics of insertion loss versus frequency for the filter set of FIG. 1 and also for a known filter set.

The network of FIG. 1 preferably has a constant-resistance input impedance at each port. This may be provided by designing the network in the manner disclosed in the abovementioned Darlington patent. The cross-over point $f_4$, shown in FIG. 2, and the minimum insertion loss $A_3$ in the stop bands will be given. The broken-line curves 16 and 17 show, respectively, typical low-pass and high-pass characteristics obtainable. At the cross-over frequency $f_4$, the loss $A_1$ is only three decibels. The low-pass filter cuts off at $f_3$ and reaches a loss of $A_3$ at $f_7$. The high-pass filter cuts off at $f_5$ and attains $A_3$ at $f_1$. Thus, the transition interval is the distance between the stop bands of the two filters, $f_7—f_1$.

In accordance with the invention, this transition interval is greatly reduced by shifting the high-pass characteristic 16 up in frequency and the low-pass characteristic 17 down in frequency. Since the portions of the curves 16 and 17 between cut-off and the edge of the stop band are substantially mirror images, the pass band of each type of filter is made to coincide with the stop band of the other type of filter by shifting the curve 16 up in frequency by half the distance between $f_5$ and $f_7$ and by shifting the curve 17 down in frequency by half the distance between $f_1$ and $f_3$. The high-pass filter now has the characteristic shown by the solid-line curve 18, with cut-off at $f_6$. The solid-line curve 19 shows the new low-pass characteristic, with cut-off at $f_2$. Now, $f_2$ is also the upper edge of the stop band of the high-pass filter, and $f_6$ is the lower edge of the stop band of the low-pass filter. The reduced transition interval is $f_6—f_2$.

The shifted loss characteristics may be obtained from the original filters by rescaling the element values. Each inductance and each capacitance in the original low-pass filter is multiplied by the ratio of $f_3$ to $f_2$. Similarly, the value of each component element of the original high-pass filter is multiplied by the ratio of $f_5$ to $f_6$.

Figure 3:
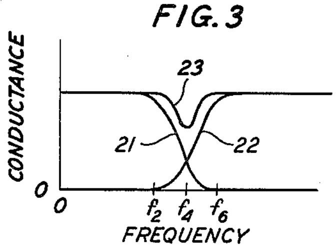
FIGS. 3 and 4 show, respectively, conductance and susceptance characteristics for the filter set of FIG. 1.
Figure 4:
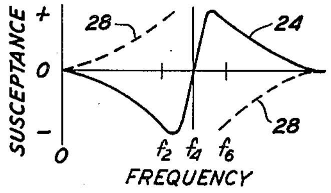

The transition interval has thus been reduced from $f_7—f_1$ to $f_6—f_2$ and the loss at the cross-over frequency $f_4$ has been increased to $A_2$, typically several times $A_1$. But shifting the characteristics in this manner has introduced a deviation, in the region of $f_4$, in the constant-resistance input impedance at each port of the filter set. In FIG. 3, the curve 21 gives the new conductance-frequency characteristic of the high-pass branch, and the curve 22 that of the low-pass branch, with resistive terminations. The input conductance at each port is given by the curve 23, which is the sum of the other two curves. The input conductance has a dip in the region of $f_4$, and the resistive component of the input impedance at each port will have a corresponding hump at this frequency. The solid-line curve 24 of FIG. 4 shows the new susceptance-frequency characteristic at each port. It is negative below $f_4$ and positive above, with a negative slope in each filter pass band.

The one-port susceptance correctors 10, 11, 12, and 13 are connected, respectively, in shunt at each of the ports 1, 2, 3, and 4 to annul this susceptance in the pass bands. In its simplest form, shown in FIG. 5, each corrector comprises only an inductor 26 of value L and a capacitor 27 of value C connected in series. These values are so chosen that the circuit resonates at $f_4$. Its susceptance characteristic is shown in FIG. 4 by the broken-line curve 28. This curve is opposite in sign to the curve 24, both above and below $f_4$. The stiffness of the circuit (the ratio $L/C$) is so chosen that the curve 28 is as nearly as possible equal in magnitude to the curve 24 in each filter pass band. The elements 26 and 27 may be made adjustable, as indicated, to facilitate finding the proper values. The correctors thus substantially annul the input susceptance of the network at each port over the pass bands, and restore the constant-resistance input impedance in these regions. The susceptance is not completely corrected in the transition interval between $f_2$ and $f_6$, and the resistance is not constant in this region, but in many systems these deviations are permissible.

Figure 5:
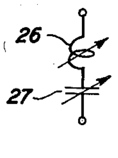
FIGS. 5 and 6 are schematic circuits of two types of susceptance correctors for use in the filter set of FIG. 1.

The susceptance corrector of FIG. 5 adds loss in the vicinity of $f_4$ to both the low-pass filter and the high-pass filter. The modified characteristics are shown by the broken-line curves 29 and 30 in FIG. 2. This added loss is advantageous when signals of this frequency are to be suppressed.

Figure 6:
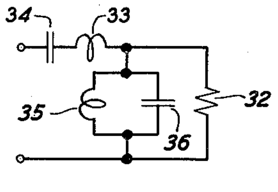

FIG. 6 shows an alternative form of susceptance corrector which may be used in FIG. 1. The circuit comprises a half section of a ladder-type, band-pass filter terminated in a matching resistor 32. The series impedance branch, at the input end, is made up of the series combination of an inductor 33 and a capacitor 34. The shunt branch comprises an inductor 35 and a capacitor 36 in parallel. The filter passes a band between $f_2$ and $f_6$, coinciding with the transition interval. This form of corrector, at the expense of a few more elements, substantially annuls the susceptance over the transition interval $f_2$ to $f_6$, as well as over the pass bands. It also makes the input conductance, and therefore the resistance, substantially constant in the transition interval.

It is to be understood that the above-described arrangements are only illustrative of the application of the principles of the invention. Numerous other arrangements may be devised by those skilled in the art without departing from the spirit and scope of the invention.

What is claimed is:

1. A wave transmission network comprising two low-pass filters and two high-pass filters alternately connected to form a closed loop with four ports at the respective junction points between filters and a susceptance corrector connected in shunt at each of the ports, each of the low-pass filters having a pass band coinciding with the stop band of each of the high-pass filters, each of the high-pass filters having a pass band coinciding with the stop band of each of the low-pass filters, and the susceptance correctors having substantially identical susceptance-frequency characteristics adapted to make the input impedance at each port more nearly non-reactive in the pass bands of the filters.

2. A network in accordance with claim 1 in which each of the susceptance correctors comprises the series combination of an inductor and a capacitor and the combination is resonant at approximately the cross-over frequency of the insertion loss versus frequency characteristics of the high-pass and low-pass filters.

3. A network in accordance with claim 1 in which each of the susceptance correctors comprises a band-pass filter terminated in a matching resistor and passing the band between the cut-off frequencies of the low-pass and the high-pass filters.

4. A wave transmission network with four ports which may be designated 1, 2, 3, and 4 comprising a low-pass filter connected between ports 1 and 2, a second low-pass filter connected between ports 3 and 4, a high-pass filter connected between ports 1 and 4, a second high-pass filter connected between ports 2 and 3, and four susceptance correctors connected, respectively, in shunt with the four ports, the pass band of each low-pass filter coinciding with the stop band of each high-pass filter, the stop band of each low-pass filter coinciding with the pass band of each high-pass filter, and the susceptance correctors having frequency characteristics selected to make the input impedance of the network at each port a substantially pure resistance throughout the pass bands of the low-pass and the high-pass filters.

5. A directional filter set comprising two low-pass filters and two high-pass filters alternately connected in tandem in a closed transmission path to provide four ports at the respective junctions of the filters and four susceptance correctors connected in shunt at the respective ports, the low-pass filters having substantially identical loss-frequency characteristics, the high-pass filters having substantially identical loss-frequency characteristics, the pass bands of the low-pass filters and those of the high-pass filters being substantially complementary, each filter having a pass band substantially coinciding with the stop band of the complementary filter, each susceptance corrector comprising the series combination of an inductor and a capacitor, the combination being resonant at a frequency lying between the pass bands of the complementary filters, and the susceptance of the combination being chosen to minimize the input susceptance at each port over the pass bands of the filters.

References Cited in the file of this patent

UNITED STATES PATENTS

| | | |
|---|---|---|
| 2,115,138 | Darlington | Apr. 26, 1938 |
| 2,768,351 | Scholten | Oct. 23, 1956 |